Jan. 5, 1965    R. A. REYNOLDS    3,164,040
HYDRO-PNEUMATIC DRILLING CONTROL SYSTEM
Filed April 4, 1960    3 Sheets-Sheet 1

ROLLIN A. REYNOLDS
INVENTOR.

BY Paul A. Weilein
ATTORNEY.

ROLLIN A. REYNOLDS
INVENTOR.

BY
Paul A. Weilein
ATTORNEY.

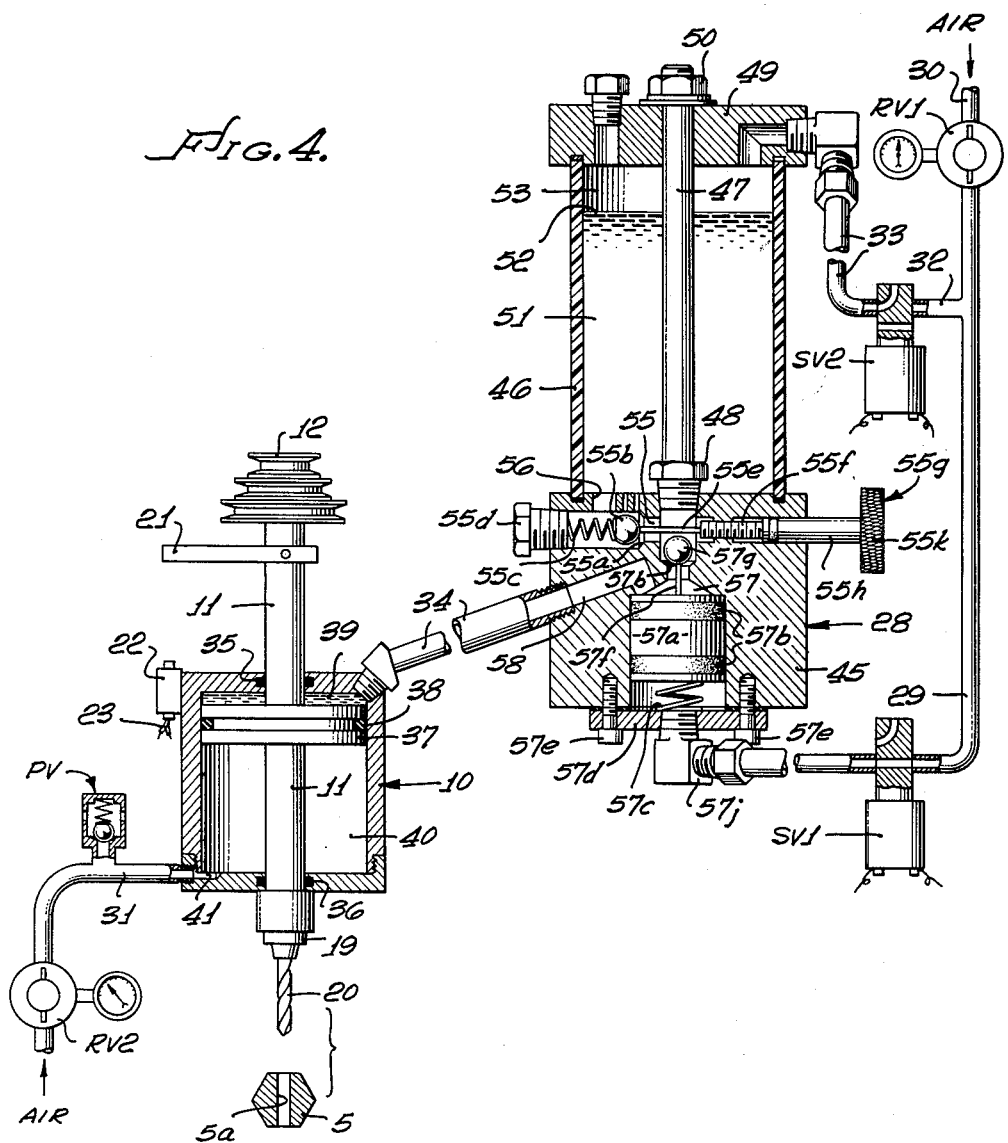

United States Patent Office 3,164,040
Patented Jan. 5, 1965

3,164,040
HYDRO-PNEUMATIC DRILLING CONTROL
SYSTEM
Rollin A. Reynolds, Palos Verdes, Calif., assignor to
Dyna Systems Inc., Torrance, Calif., a corporation of
California
Filed Apr. 4, 1960, Ser. No. 19,616
16 Claims. (Cl. 77—32.3)

The present invention relates to a drilling control system of the fluid pressure controlled type, and more particularly to a drilling control system employing air pressure applied to a body of hydraulic fluid so as to not only effect feed of a power drill and the retraction of the drill upon the completion of its maximum feed stroke, but also to effect intermittent partial retractions of the drill and movement of the drill back to a work engaging position under working pressure so as to enhance both the drilling action and the life of the drill bit.

While prior drilling control devices of the hydro-pneumatic type have been employed for effecting the automatic feed of the working spindle of drilling devices such as drill presses and for returning the spindle to an elevated position upon completion of the drilling stroke of the spindle as well as for effecting intermittent slight retraction of the drill bit in the hole being drilled and reapplication of the bit to the drilling position, such devices have had certain notable shortcomings, principal among which is the reapplication of the drill bit to the base of the bore being drilled at low drilling pressure in relation to that required to advance the bit through the material being drilled. As a consequence of low pressure reapplication of the bit to the base of the bore, the bit is adversely effected and dulled and the work material may be burnished and hardened as pneumatic pressure in such prior systems accumulates to such a value as to force the bit to again commence penetrating the material. Thus, especially in mass production drilling, much time is lost and drill bits require frequent resharpening or replacement.

It is a primary object of the present invention to provide an air operated hydraulic drill bit feeding device wherein the bit, subsequent to being retracted slightly from the base of the bore being formed in a work piece, is reapplied under full drilling pressure in timed cycles, thus substantially enhancing the life of the drill bit as well as reducing the time required to drill a given work piece. Accordingly, it will be recognized that the present invention has significant advantages where work pieces are being drilled in large numbers on a production basis. As an example of such drilling work, large numbers of fasteners such as cap screws are provided with a drilled hole through the screw head for reception of a locking tie wire or the like.

More specifically, it is an object of the present invention to provide an air operated drill feeding device which will automatically and cyclically effect slight retraction of the drill bit from the bore being formed in the work piece, while the pneumatic pressure applied to the hydraulic fluid for forcing the feed of the drill spindle is maintained constant, the drill bit subsequently being fed back to its working position and being instantaneously subjected to full feed pressure.

In accomplishing the foregoing objective, means are provided for bleeding off from the hydraulic fluid pressure system a small quantity of the hydraulic fluid so as to enable retraction of the drill bit a slight distance from the base of the bore in the work piece, and upon the completion of bleeding such small quantity of the hydraulic fluid, reinjecting the fluid back into the hydraulic pressure system so as to cause the drill to be fed back into engagement with the work piece under drilling pressure.

A more specific object of the invention is to provide a drill feed mechanism including a cylinder through which the drill spindle extends, this cylinder housing a piston connected to the drill spindle and separating the housing into a pneumatic chamber at one side of the piston and a hydraulic chamber on the other side of the piston. The hydraulic chamber being in communication with a source or reservoir of hydraulic fluid which is subjected to pneumatic pressure so as to effect feeding of the spindle through the cylinder against the air pressure in the air chamber therein. Associated with the hydraulic reservoir is a pneumatically controlled piston which is disposed in a small volume chamber in communication with the reservoir through a valved passage containing a valve actuated by the piston in the small chamber. The piston in this small chamber is preferably air pressure actuated to a position whereat hydraulic fluid is displaced therefrom into the hydraulic chamber in the drill feed cylinder and whereat the valve in the valved passage is open. Cyclically, the air pressure acting on the piston in the small chamber is exhausted so that hydraulic pressure will shift the same to a position allowing the entry into the small chamber of hydraulic fluid forced from the hydraulic drill feed chamber by the air pressure acting on the drill feed piston, the valve in the valved passageway being initially closed upon such movement of the piston in the small chamber.

While specific objects have been expressed above, it will be understood that a general object is to provide fluid pressure operated means for advancing and retracting a member in a manner advantageous in applications other than that specifically illustrated herein, and other objects and advantages of the invention will be hereinafter described or will become apparent to those skilled in the art, and the novel features of the invention will be defined in the appended claims.

In the accompanying drawings:

FIG. 4 is a further view corresponding to FIG. 2 but showing the drill spindle in the fully retracted position subsequent to having completed the drilling of a work piece.

Like reference characters in the several views of the drawings and in the following detailed description designate corresponding parts.

Figures 1, 2:
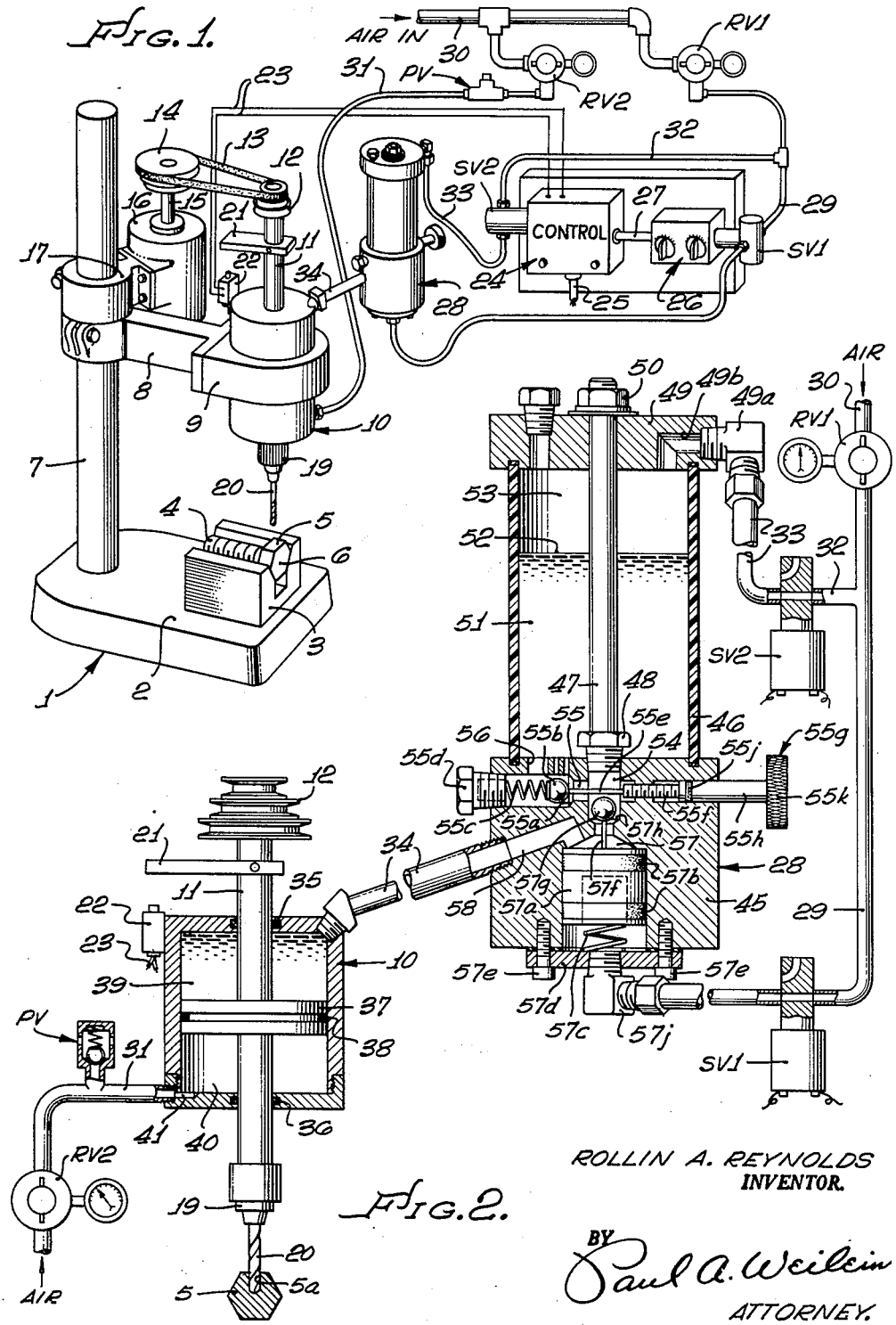
FIG. 1 is a view in perspective illustrating a simple form of drill press equipped with drill feed mechanism in accordance with the invention.
FIG. 2 is a diagrammatic view, with certain of the parts shown in section, showing the drill feed mechanism in operating condition to feed the drill into a work piece.

Referring first to FIG. 1, there is generally shown a drill press 1 having a table 2 provided with a work holder 3. This work holder is illustrative only and may be typically particularly constructed for the reception of a screw element 4 having a hexagonal head 5 thereon, this head 5 seating in a divergent seat 6 formed in the work holder. Upstanding from the table 2 is a standard 7 on which is suitably supported an outstanding arm 8 provided with a supporting member 9 in which is disposed a drill spindle feed cylinder 10 through which extends a drill spindle 11. This spindle 11 at its upper end has a series of vertically spaced pulleys 12 of varying diameters engageable selectively by a drive belt 13 powered by a drive pulley 14 on a motor shaft 15 projecting from a motor 16. This motor is supported on an appropriate supporting bracket 17 also mounted upon the standard 7 in any appropriate manner. The spindle 11 at its lower end is provided with a conventional chuck 19 in which is supported a drill bit 20 adapted to drill a hole through the hexagonal head 5 of the screw 4 as the spindle 11 is fed through the feed cylinder 10. Supported upon the spindle 11 above the cylinder 10 is an arm 21 engageable with a switch 22 which is electrically connected by leads 23 with a drill feed control generally designated 24.

Drill feed control 24 is provided with a conductor cable lead 25 which may be connected to a suitable source of electric power. To one side of the control 24 is a conventional timing mechanism generally designated 26 electrically connected to the control 24 by a conductor lead 27.

This timer 26 is adapted to cyclically control a solenoid operated valve designated SV1 while the control 24 responsive to actuation of the switch 22 by switch arm 21 is provided with a solenoid valve designated SV2.

Effectively interposed between the drill feed cylinder 10 and the control 24 and timer 26 is a hydraulic fluid reservoir generally designated 28. Leading to the lower end of the reservoir via the solenoid valve SV1 is an air inlet line 29 which passes through a pressure regulating valve designated RV1, the latter being connected to an air inlet conduit 30. Leading from the conduit 30 is an air inlet line 31 connected to the lower end of the drill feed cylinder 10 and having therein a pressure regulating valve of any conventional construction and designated RV2. Interposed in line 31 between regulator valve RV2 and the drill feed cylinder is a relief or pop valve designated PV. Leading from the air inlet line 29 between regulator valve RV1 and solenoid valve SV1 is a line 32 which is connected through solenoid valve SV2 with a line 33 leading to the upper end of the reservoir 28. A conduit 34 extends from the reservoir 28 to the upper end of the drill feed cylinder 10.

It is apparent from the structure thus far generally described and shown in FIG. 1 that with the reservoir 28 containing hydraulic fluid there is hydraulic communication between the reservoir 28 and the upper end of the hydraulic drill feed cylinder 10 while there is a pneumatic communication extending from the air inlet conduit 30 to the lower end of the hydraulic drill feed cylinder 10 and to both the upper and lower ends of the reservoir 28 through solenoid valves SV1 and SV2.

The solenoid valve SV1 is appropriately controlled by the timer 26 to cyclically actuate the valve SV1 to permit the flow of air through line 29 to the lower end of the reservoir 28 and to block such flow and exhaust the air to atmosphere. The control unit 24 is effective under the control of switch 22 to actuate solenoid valve SV2 to permit the flow of air from line 32 to the upper end of the reservoir 28 through line 33 or to block such flow and exhaust the air to the atmosphere. The details of construction of the control unit 24 and the timer 26 are not significant insofar as the instant invention is concerned and therefore need not be described in detail other than as pointed out above in order to describe their function in the control mechanism.

Figure 3:
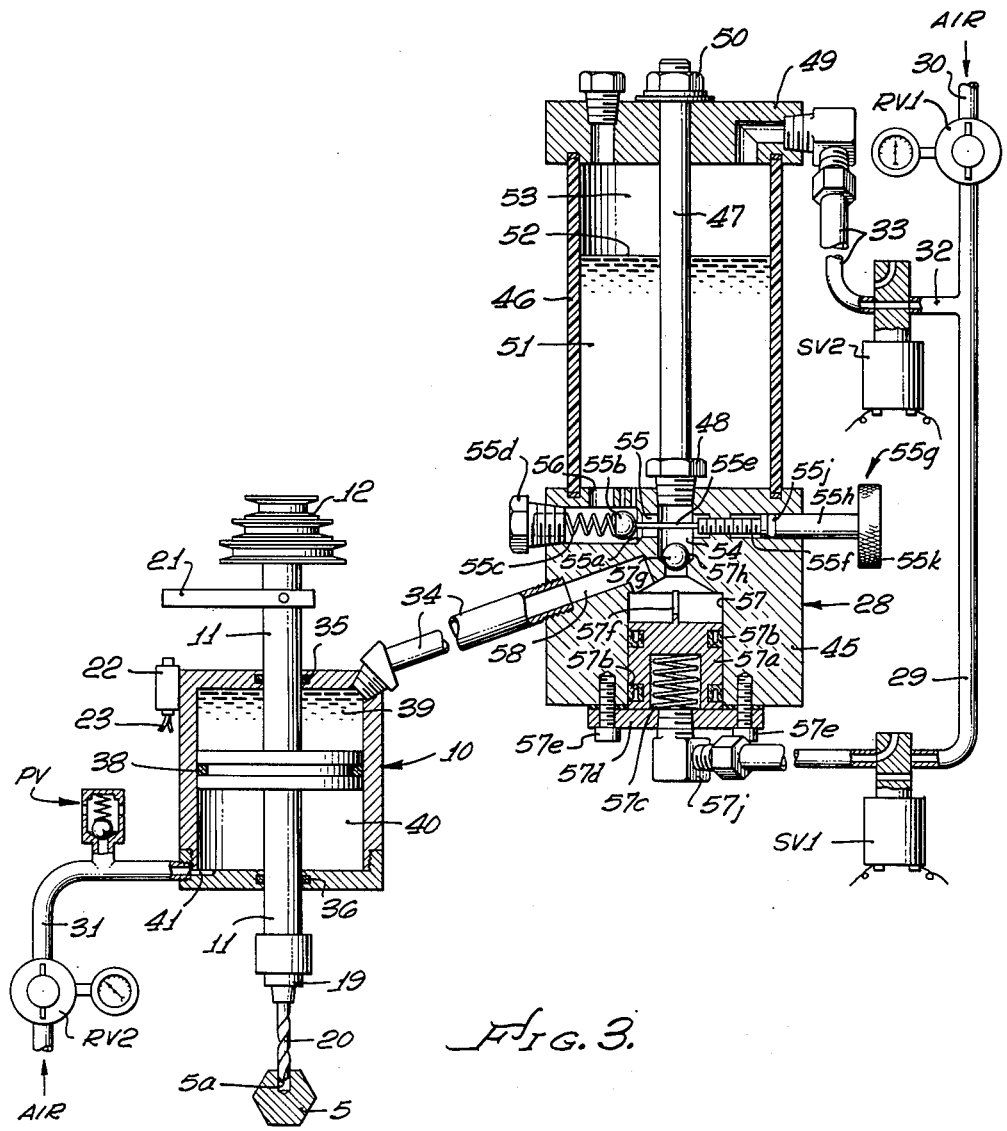
FIG. 3 is a view corresponding to FIG. 2, but showing the drill spindle retracted slightly in the bore being formed in the work piece, under the control of the drill feed mechanism of the invention.

Referring to FIGS. 2-4 the control air circuit is diagrammatically illustrated, and the structural elements of the drill feed cylinder 10 and the reservoir 28 are illustrated to better advantage. The drill feed cylinder 10, it will be observed, has spindle 11 extending through the top and bottom of the cylinder and appropriately sealed as by O-rings 35, 36. Within the cylinder 10 is a drill feed piston 37 suitably formed on or attached to the spindle 11 and sealed as by an O-ring 38 to the inner wall of the cylinder 10 so as to define a hydraulic drill feed chamber 39 at the upper side of the piston and a pneumatic drill retracting chamber 40 at the lower side of the piston 37. Air line 31 leads into the air chamber 40 through a port 41, while conduit 34 communicates with the hydraulic chamber 39 of the power feed cylinder 10. Accordingly, it will be recognized that the alternate application of high and low pressures to the hydraulic and pneumatic chambers 39 and 40 at opposite sides of the drill feed piston 37 will effect feed and retraction of the spindle 11. Such feed and retraction is under the control of the solenoid valves SV1 and SV2 as will presently appear.

The reservoir 28 comprises a base 45 on the upper side of which is disposed a hollow cylinder 46 preferably composed of transparent material and secured on the base 45 as by a tie rod 47 connected at one end as by a fitting 48 to the base, with the other end of the rod 47 extending through a head plate 49 and clamping the latter in engagement with the upper end of the cylinder 46 as by a nut 50. The reservoir cylinder 46 has therein a body 51 of oil or other hydraulic fluid which when the drill spindle 11 is fully retracted, as shown in FIG. 4, has a level as indicated at 52 disposed at an elevation below the head plate 49 so as to provide an air chamber 53 above the body of fluid 51.

The body of fluid 51 communicates through the reservoir base 45 and conduit 34 to the hydraulic chamber 39 of the drill spindle feed device 10. In this connection it will be noted that the base 45 is provided with a central passageway 54 which is in communication with a laterally extended passage 55 which in turn is in communication with a port 56 in the body 45 leading from the reservoir cylinder 46. The central passageway 54 also communicates with a small piston chamber 57 which is in communication at its upper end with a passageway 58 leading to the conduit 34.

The passageway 55 is preferably so formed as to provide a valve seat 55a therein engageable by a ball valve 55b which is loaded by a coiled compression spring 55c toward the seat 55a. Spring 55c is retained in place by a spring retainer and plug 55d. Thus, the ball valve 55b is normally spring loaded toward its seat 55a, but it is adapted to be held off of its seat by a pin 55e formed on the inner end of a valve operating stem 55g, threaded as at 55f in a threaded bore of the body 45. The stem 55g is provided with an unthreaded section 55h sealed as by an O-ring 55j in the stem receiving bore. The extremity of the stem 55g is preferably provided with an operating head 55k, whereby the stem may be easily rotated to move the ball valve 55b away from its seat or allow movement thereof toward its seat as may be desired to effect adjustment of the drilling feed rate, i.e., the rate at which the drill spindle 11 will be moved axially in a manner which will hereinafter be more particularly described.

Within the piston chamber 57 is a piston 57a sealed as by packings 57b in the piston chamber 57 and spring loaded inwardly as by a spring 57c. This spring 57c abuts with a plate 57d forming a closure for the piston chamber 57 and is secured in place as by means of cap screws 57e. At its inner end the piston 57a is provided with a stem 57f extending into the passageway 54 for engagement with a ball valve 57g engageable with a valve seat 57h formed in the passageway 54. The pin 57f is of such a length that when the piston 57a is shifted downwardly in the chamber 57 the ball 57g will be allowed to seat upon seat 57h to prevent the transfer of hydraulic fluid from the reservoir cylinder 46 into the hydraulic chamber 39 of the drill spindle feed mechanism 10.

It will be noted however, as shown in FIGS. 2 and 4, that when the piston 57a is in its uppermost position, and in fact, just prior to reaching the uppermost position, the pin 57f holds the ball valve 57g off its seat 57h to permit the flow of fluids between reservoir cylinder 46 and hydraulic chamber 39. In the schematic showings of FIGS. 2, 3 and 4, it will be noted that air inlet line 31 leads from regulator valve RV2 into air chamber 40 of the drill feed device 10, while air inlet line 32, and air inlet line 29 are respectively connected to the upper and lower ends of the reservoir device 28 through the respective solenoid valves SV2 and SV1, and the pressure applied at the opposite ends of the reservoir device is under the control of regulator valve RV1.

Assuming both of the solenoid valves SV1 and SV2 to be open as shown in FIG. 2, air under pressure will pass therethrough into the air chamber 53 in reservoir cylinder 46 through a fitting 49a threaded into the plate 49 and communicating with a passage 49b leading into the pressure chamber 53. Air at the same pressure will be applied to the underside of piston 57a in chamber 57 through a fitting 57j threaded into the closure plate 57d. Accordingly, the piston 57a will be held in its uppermost position with the valve 57g off its seat 57h, and hydraulic fluid will be transferred from the body 51 through port 56 into passage 55, between ball valve 55b and valve seat 55a, thence into the central passageway 54 and into the upper end of the piston chamber 57, from whence it may pass through passageway 58 and conduit 34 into hydraulic chamber 39, assuming that the air pressure in air pressure chamber 40 of drill spindle feed device 10 is under the control of regulator valve RV2 at a pressure sufficiently lower than the pressure in the chamber 53 as to permit downward movement of the spindle 11. Thus, it is observed that downward movement of the spindle 11 and consequent feed of the spindle whereby penetration of the bit 20 into the work piece 5 is effected, is caused by the application of air pressure in the space 53 above the body of hydraulic fluid 51 causing the transfer of such hydraulic fluid into the hydraulic spindle feed chamber 39. Relief valve PV in line 31, as previously described, will allow air in air pressure chamber to be bled to thereby maintain an even pressure opposing downward movement of spindle 11 with resultant fine control which is especially advantageous with low operating fluid pressures for small size drills.

As previously described, the solenoid valve SV1 is under the control of a cyclically operated timer as indicated at 25 whereby the solenoid valve SV1 is at predetermined timed intervals shifted from the open position shown in FIG. 2 to the position shown in FIG. 3, wherein it will be noted that air pressure supply line 29 leading from regulator valve RV1 has been closed, while the piston chamber 57 at the lower side of piston 57a is exhausted to atmosphere through the exhaust port of the solenoid valve SV1. At the same time, however, solenoid valve SV2 remains open so that air pressure is continuously applied in the space 53 tending to force the body of hydraulic fluid 51 into the hydraulic feed chamber 39. However, immediately upon exhausting air from chamber 57 through valve SV1 with resultant downward movement of the piston 57a in the chamber 57, the ball check valve 57g is released for movement into engagement with the seat 57h so that the transfer of fluid from the reservoir cylinder 46 to the hydraulic feed chamber 39 is precluded. At the same time that the solenoid valve SV1 is shifted to vent the lower end of the piston chamber 57 to atmosphere, air pressure in chamber 40 of the drill spindle feed mechanism 10 acting on the spindle feed piston 37 will shift the spindle upwardly, forcing the hydraulic fluid in the chamber 39 through conduit 34 into the upper end of the piston chamber 57 to depress the piston 57a to the position shown in FIG. 3. Thus, it will be observed that upward movement of the spindle 11 is a function of the volumetric displacement of hydraulic fluid from hydraulic feed chamber 39 into piston chamber 57 so that the drill bit 20 will be raised slightly in the bore 5a which is being drilled in the work piece 5.

Under the control of the timer 25 the retraction of the spindle 11, as shown in FIG. 3, may be for any desired period of time but is preferably only momentary so as to enable cooling and more effective lubrication of the bit 20, as is particularly desirable in the drilling of modern-day tough alloys or austenitic steels.

Upon shifting of the solenoid valve SV1 from the position shown in FIG. 3 back to the position shown in FIG. 2, wherein air under pressure is free to pass into the lower end of the piston chamber 57, the piston 57a will displace the fluid from the upper end of the chamber 57 back into the hydraulic feed chamber 39 and as the piston 57a approaches the upper limit of its movement, the ball valve 57g will be displaced from its seat 57h. Therefore, simultaneously, or substantially so, with the unseating of ball valve 57g the drill bit 20 will be moved downwardly so as to re-engage the base of the bore 5a in the work piece 5 under the full influence of air pressure in the space 53 above the body of hydraulic fluid 51 in reservoir cylinder 46. Accordingly, the bit 20 will not revolve under light pressure contact at the base of the bore 5a, but will be forcefully driven axially into engagement with the base of the bore 5a so as to re-establish the cutting action without polishing or burnishing the base of the bore and dulling of the lead end of the bit 20. Such forceful re-engagement of the bit in the base of the bore 5a has been found to not only expedite the drilling of the bore 5a completely through the work piece 5 or to such depth as may be desired, but has also been found to enhance the life of the bit 20 so that it is effective for longer periods of time without requiring replacement or reworking.

When the spindle 11 has reached a desired limit of downward movement, i.e., when the bit 20 has fully penetrated the work piece 5 so as to provide a bore 5a completely therethrough or when the bit has penetrated a work piece 5 to the desired depth, the switch actuating arm 21 on the drill spindle 11 will actuate switch 22 so as to energize solenoid valve SV2 to shift the latter from the open condition shown in FIGS. 2 and 3 to the closed condition shown in FIG. 4, wherein air is exhausted from the space 53 above the fluid level 52 in the reservoir cylinder 46 to atmosphere whereby air pressure in chamber 40 of the spindle feed device 10 will cause vertical movement of the spindle 11 to the position shown in FIG. 4 and displacement of the hydraulic fluid from chamber 39 into the reservoir cylinder 46, so as to permit removal of the drilled work piece and the application of a new work piece to a location beneath the bit 20. It will be appreciated that if desired the present drill feed mechanism may be employed in conjunction with automatic work feeding mechanism (not shown) in order to effect further economies in time when drilling large numbers of work pieces.

It will also be appreciated that the ball valve 55b and the operating means therefor constitutes a drilling rate control valve inasmuch as the flow clearance past the ball valve 55b may be finely adjusted by the stem 55g so as to more or less restrict the flow of hydraulic fluid between reservoir cylinder 46 and hydraulic feed chamber 39.

While the specific details of the invention have been herein shown and described in relation to a drilling machine feed control, it will be recognized that the invention has application to other feed mechanisms where it is desired to not only feed a device and retract such device, but also it is desired to effect intermittent partial retraction and feeding of the device, and changes and alterations may be resorted to without departing from the spirit of the invention as defined in the appended claims.

I claim:

1. Feed apparatus including a cylinder; a member to be fed; piston means connected to said member and disposed in said cylinder; hydraulic fluid in said cylinder applicable to said piston means to effect feed of said member in one direction; means for supplying air under pressure to said cylinder applicable to said piston means to effect retraction of said member; means for supplying hydraulic fluid under pressure to said cylinder including a reservoir; said reservoir including a container having a body of hydraulic fluid therein and a passageway communicating with said cylinder; means for applying air under pressure to said container above said body of fluid; means providing an expansible chamber communicating with said passageway; valve means in said passageway; and means for intermittently closing said valve means and allowing expansion of said chamber to receive fluid from said cylinder and for causing hydraulic fluid to be displaced from said expansible chamber back into said cylinder and to open said valve means.

2. Feed apparatus including a cylinder; a member to be fed; piston means connected to said member and disposed in said cylinder; hydraulic fluid in said cylinder applicable to said piston means to effect feed of said member in one direction; means for supplying air under pressure to said cylinder applicable to said piston means to effect retraction of said member; means providing a hydraulic fluid reservoir communicating with said cylinder and including a body having a passageway leading from said reservoir to said cylinder; valve means in said passageway; means for applying air under pressure to the fluid in said reservoir to force said hydraulic fluid into said cylinder and feed said member when said valve means is open; fluid pressure operated means for holding said valve means open and for intermittently closing said valve means; said fluid pressure operated means including a piston chamber in said body; a piston reciprocable in said piston chamber; said passageway and said piston chamber being in communication on one side of said piston in said chamber when said valve means is open; means for applying fluid pressure to said piston chamber at the opposite side of said piston in said chamber to open said valve means and displace hydraulic fluid from said chamber; and means for exhausting fluid pressure from said piston chamber to close said valve means and to permit the flow of hydraulic fluid from said cylinder to said piston chamber.

3. Apparatus for feeding a spindle toward a work piece, comprising: a spindle; hydraulic fluid pressure operated means for feeding said spindle in the direction of said work piece; and means for effecting slight reciprocation of said spindle relative to said work; said spindle reciprocating means including fluid pressure operated fluid moving means for bleeding a quantity of hydraulic fluid from said spindle feeding means to move the spindle away from the work piece and reinjecting said quantity of hydraulic fluid into said spindle feeding means to move the spindle towards the work piece.

4. Apparatus for feeding a spindle toward a work piece comprising: a spindle; hydraulic fluid pressure operated means for feeding said spindle in the direction of said work piece; means for effecting intermittent slight reciprocation of said spindle relative to said work piece; said spindle reciprocating means including fluid pressure operated plunger means for bleeding a quantity of hydraulic fluid from said spindle feeding means and reinjecting said quantity of hydraulic fluid into said spindle feeding means; and means for intermittently operating said spindle reciprocating means.

5. Apparatus for feeding a spindle toward a work piece comprising: a spindle; hydraulic fluid pressure operated means for feeding said spindle in the direction of said work piece; means for effecting slight reciprocation of said spindle relative to said work piece; said spindle reciprocating means including fluid pressure operated fluid moving means operable in one direction for bleeding a quantity of hydraulic fluid from said spindle feeding means and in an opposite direction for reinjecting said quantity of hydraulic fluid into said spindle feeding means; and means responsive to the feed of said spindle to a selected position for relieving hydraulic fluid pressure in said spindle feeding means nad retracting said spindle.

6. Spindle feed apparatus comprising: a spindle; means providing a hydraulic fluid spindle feed chamber and a pneumatic spindle retracting chamber; a member exposed to pressure in said chambers and connected to said spindle for feeding said spindle towards a work piece and retracting said spindle responsive to differential pressures in said chambers; means for providing a spindle feed pressure to said feed chamber; and means for bleeding a quantity of hydraulic fluid from said feed chamber and reinjecting said quantity of hydraulic fluid to effect slight reciprocation of said spindle.

7. Spindle feed apparatus comprising: a spindle; means providing a hydraulic fluid spindle feed chamber and a pneumatic spindle retracting chamber; a member exposed to pressure in said chambers and connected to said spindle for feeding said spindle towards a work piece and retracting said spindle responsive to differential pressures in said chambers; hydraulic fluid reservoir means including a passage leading to said feed chamber; means for applying spindle feeding air pressure to the hydraulic fluid in said reservoir; and means for substantially simultaneously closing off said passage and bleeding off from said feed chamber a quantity of hydraulic fluid and for subsequently reinjecting said quantity of fluid into said feed chamber and opening said passage, whereby said spindle is retracted and subsequently biased toward said work piece at full spindle feed pressure.

8. Apparatus as defined in claim 7 wherein the means for applying spindle feeding air pressure to the hydraulic fluid in said reservoir includes: a valve having means for venting said reservoir to atmosphere; and means operable by said spindle upon feed of said spindle to a predetermined position for operating said valve to vent said reservoir.

9. Apparatus as defined in claim 7 wherein the means for substantially simultaneously closing off said passage and bleeding off from said feed chamber a quantity of hydraulic fluid comprises: fluid pressure operated means normally maintaining said passage open; and valve means for venting said just-mentioned fluid pressure operated means to atmosphere to enable said passage to be closed off.

10. Spindle feed apparatus comprising: a spindle; means providing a hydraulic fluid spindle feed chamber and a pneumatic spindle retracting chamber; a member exposed to pressure in said chambers and connected to said spindle for feeding said spindle toward a work piece and retracting said spindle responsive to differential pressures in said chambers; hydraulic fluid reservoir means including a passage leading to said feed chamber; valve means in said passage movable from a first position with said passage open, to a second position with said passage closed; means for applying spindle feeding air pressure to the hydraulic fluid in said reservoir through said passage when said valve means is in said first position; means including a chamber communicating with said passage and having a piston reciprocable therein and engageable with said valve means upon movement of said piston in one direction for substantially simultaneously enabling movement of said valve means to said second position and bleeding off from said feed chamber a quantity of hydraulic fluid and for subsequently reinjecting said quantity of fluid into said feed chamber and moving said valve means to said first position upon movement of said piston in the other direction, whereby said spindle is retracted and subsequently biased toward said work piece at full pressure; and means for reciprocating said piston.

11. Apparatus as defined in claim 10 including: fluid pressure operated means for shifting said piston in said chamber; and valve means for cyclically controlling the operation of fluid pressure operated means.

12. Apparatus as defined in claim 10 including means for venting said reservoir above said hydraulic fluid therein to atmosphere upon movement of said spindle a predetermined distance.

13. Hydro-pneumatic control apparatus comprising: a fluid pressure actuated device having a cylinder and a piston reciprocable in said cylinder; means for supplying fluid under pressure to one side of said piston; means providing a closed reservoir for a body of liquid; an air inlet to said reservoir; a passageway leading from said reservoir adjacent its base and communicating with the cylinder at the other side of said piston; valve means in said passageway movable from a first position closing said passageway to a second position opening said passageway;

means providing an expansible chamber communicating with said passageway including a shiftable member having a part engageable with said valve means for effecting movement of said valve means from said first position to said second position; and means for shifting said member.

14. Apparatus as defined in claim 13, wherein the means for shifting said member includes cyclically operated fluid pressure supply means.

15. In apparatus for feeding a work treating member through a full range of movement into and from work treating position with said member progressively advanced into different work treating positions; means for effecting partial retraction of said member the same distance from each of said progressively advanced work positions and for returning said member to said each of the work treating positions; said means including means, operable by a fluid pressure acting in a direction for urging said member in a feeding direction and continuing said feed of said member at full pressure upon each return of said member to one of said progressively advanced work treating positions; and means for modulating said fluid pressure by intermittently decreasing it below that required to feed said member.

16. Feed apparatus including a cylinder; a work treating member to be progressively advanced into different work treating positions; piston means connected to said member and disposed in said cylinder; hydraulic fluid in said cylinder applicable to said piston means to effect said feed of said member in one direction; means for supplying air under pressure to said cylinder applicable to said piston means to effect retraction of said member; means for effecting partial retraction of said member the same extent from each progressively advanced work treating position and returning said member back into said each work treating position, said last named means including provision for applying full hydraulic feed pressure to said piston upon return of said member to and while at each work treating position; and means for modulating said fluid pressure by intermittently decreasing it below that required to feed said member.

References Cited in the file of this patent

UNITED STATES PATENTS

| | | |
|---|---|---|
| 2,239,893 | Jackman | Apr. 29, 1941 |
| 2,350,117 | Kline | May 30, 1944 |
| 2,418,841 | Karweit | Apr. 15, 1947 |
| 2,654,270 | Adcock | Oct. 6, 1953 |
| 2,977,826 | Radford | Apr. 4, 1961 |

FOREIGN PATENTS

| | | |
|---|---|---|
| 621,559 | Great Britain | Apr. 12, 1949 |